United States Patent [19]

Wigley

[11] Patent Number: 4,741,167

[45] Date of Patent: May 3, 1988

[54] METHOD AND APPARATUS FOR TRANSPORTING PERISHABLE MATERIALS

[76] Inventor: Freddie J. Wigley, 712 North Birch, Ponca City, Okla. 74601

[21] Appl. No.: 933,044

[22] Filed: Nov. 20, 1986

[51] Int. Cl.⁴ ............................................. F25D 17/02
[52] U.S. Cl. ......................................... 62/62; 62/388; 312/6
[58] Field of Search ............... 62/384, 388, 62; 312/3, 312/4, 5, 6, 257 SK

[56] References Cited

U.S. PATENT DOCUMENTS

| | | | |
|---|---|---|---|
| 1,498,322 | 6/1924 | Hyams | 312/6 |
| 2,913,029 | 11/1959 | Paton | 312/6 |
| 3,722,905 | 3/1973 | Solomon | 312/6 |
| 3,864,936 | 2/1975 | Frank et al. | 62/384 |

Primary Examiner—Ronald C. Capossela
Attorney, Agent, or Firm—William J. Miller

[57] ABSTRACT

A method and apparatus for the refrigeration of perishable materials which are stored on a cart having a top, a bottom and a side. The apparatus consists of a first insulation extending over the bottom of the cart and a second insulation material surrounding the sides and top of the cart. Refrigeration material such as dry ice is added at the top around the second insulation in a manner so that the refrigerated gases expelled by the dry ice fall in the space between the second insulation material and the cart, thereby expelling any hot air which passes through the second insulation material or into the refrigerated space around the bottom of the cart.

5 Claims, 3 Drawing Sheets

METHOD AND APPARATUS FOR TRANSPORTING PERISHABLE MATERIALS

BRIEF DESCRIPTION OF THE PRIOR ART

One commodity which is extensively dispensed in stores is pre-packaged ice. The general method for transporting pre-packaged ice is to place the ice on pallets, place the pallet containing the ice in refrigeration trucks and then transport the pre-packaged ice to the location where it is normally stored for dispensing to the general public. Each store generally provides a refrigeration apparatus with a door or doors on the front for permitting access to the ice stored within the refrigerated unit. Ice is replaced from the refrigeration storage pallets and into the unit from time to time as the ice is used.

The above process requires an immense amount of labor and an expensive refrigeration truck in order to supply the various locations with pre-packaged ice. Attempts have been made to transport the ice in containers using dry ice, but the dry ice is placed between the bags in order to maintain the bags in a frozen condition during transport. The pallet containing the pre-packaged ice is generally wrapped in plastic.

BRIEF DESCRIPTION OF THE INVENTION

This invention permits the transportation of pre-packaged ice or other perishable materials in a non-refrigerated truck, so long as the truck maintains a temperature internally during the period of transportation of approximately 80° F. or lower. It is obvious that the investment in a non-refrigerated transportation apparatus, such as a truck, is substantially less, and furthermore, the operation of a non-refrigerated truck is substantially less since no refrigerator needs to be operated during the period of transportation or storage of the materials in the truck.

This invention provides a wheel mounted cart with an insulation material on the bottom of the cart to prevent heat from entering through the bottom to the ice or other perishable material stored close to the bottom and causing the same to melt or deteriorate. The invention also provides an insulation material which covers the sides and top of the cart. A plurality of accessible pockets are provided which surround the top of the cart. The accessible pockets are provided with additional insulation in the form of flaps. Dry ice is generally placed into the pockets on all four sides. The flaps are then extended over the dry ice pockets to further insulate the pockets from the external environment. The inside of the pockets are perforated so that the dry ice, as it sublimates, will cause the carbon-dioxide which is heavier than air to fall downwardly between the insulation material and the material being transported within the cart. The cooled carbon-dioxide, as it falls between the insulation and the perishable material, will remove any heat entering either through the insulation, cracks or openings in the insulation along the side of the insulation, or at the bottom of the insulation, thus, all of the heat entering the enclosed unit will be expelled by the falling carbon-dioxide.

Another alternate method is also disclosed where the carbon-dioxide storage pockets are attached to the cart and are not accessable from the outside.

DETAILED DESCRIPTION OF THE FIGURES

Figure 1:
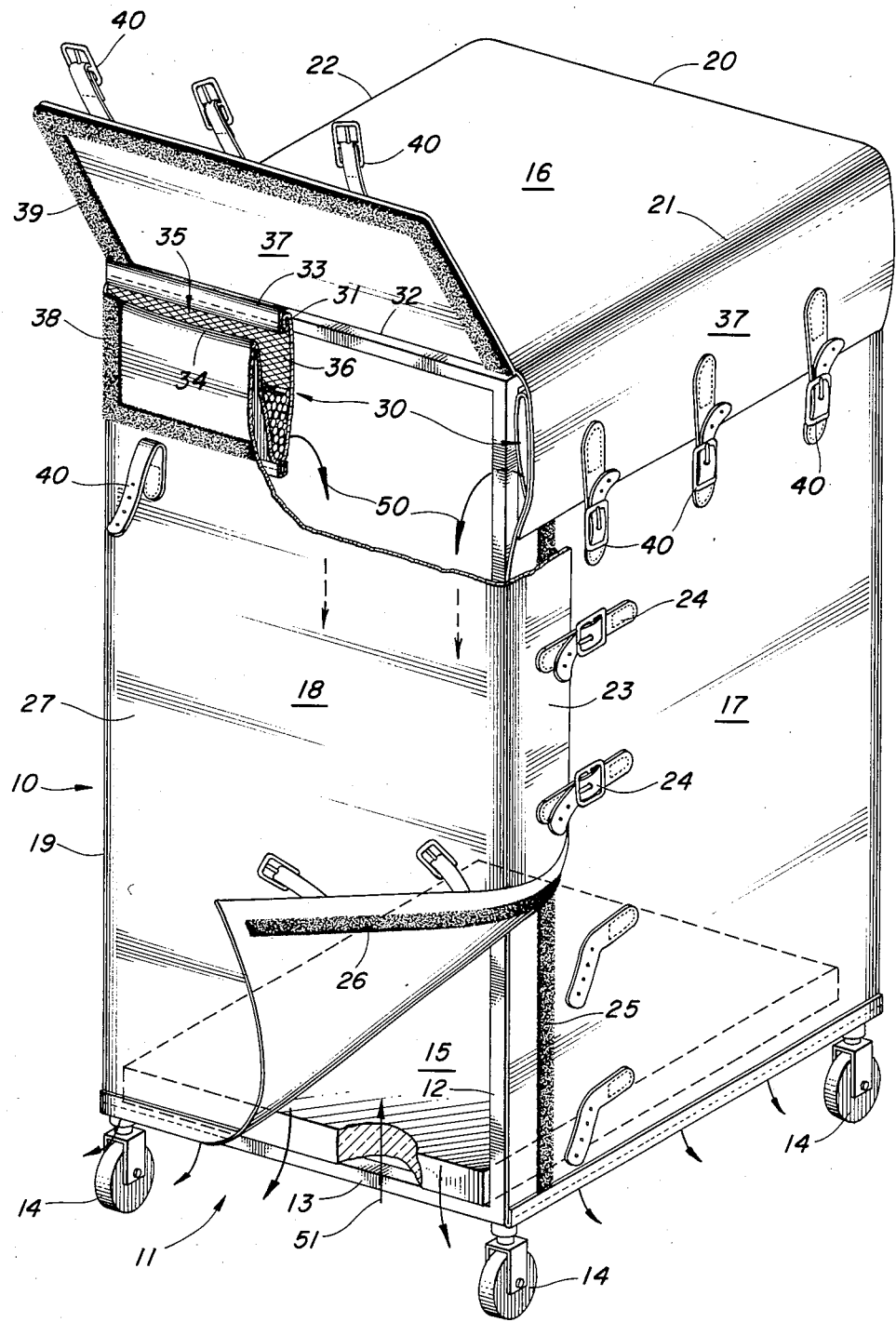
FIG. 1 is an isometric drawing of the preferred embodiment of this invention.

Referring to all of the Figures but in particular to FIG. 1, a transportation unit generally referred by arrow 10 comprises a cart 11 having sides 12, a bottom 13 and wheels 14. Cart 11 can be made of aluminum, stainless steel or any other suitable material. Such carts are well known and are currently used for transporting materials. Normally a cart such as that illustrated in FIGS. 1 or 2 has a plurality of shelves for placing produce thereupon.

This invention is specifically directed toward the transportation of frozen products from a warehouse to a store location. Since the frozen products are merely stacked in the cart, such shelves are not necessary and are not illustrated in the invention.

At bottom 13 of cart 11 is placed an insulating material 15, such material can be foamed rigid plastic or other insulation material, preferably of an inch to an inch and a half in thickness. The foamed rigid plastic material can be covered with a protection device such as a grate cart, so that the ice will not crush the insulation, thereby reducing its insulation qualities.

Surrounding cart 11, as illustrated in FIGURE 1, is a second insulation material 27 having a top 16, a left side 17, a front 18, with the right side and back not illustrated. It is obvious, of course, that the back will be one continuous piece of insulation attached along an edge 19 to left side 17 and to the corresponding edge of the right side which is not shown. Top 16 is also attached to back (not shown) along edge 20 and to left side 17 along edge 21 and to the right (not shown) along edge 22.

To permit access to and installation of second insulation means 27, the front portion 18 is provided with a flap 23 on side 17 and a corresponding flap on the right side (not shown). Flap 23 may be attached to side 17 by any or all of several means. The first is a plurality of belts 24. The second is a pressure adhering strip 25, generally sold under the trademark "Velcro", on side 17 and a mating pressure adhering strip 26 on the underside of flap 23. There is a flap corresponding to flap 23 on the right side of second insulation material 27 and attaches in a similar manner to that described for flap 23.

Surrounding top 16 of second insulation material 27 is a plurality of pockets referred to by arrow 30. Each of these pockets is attached along its first top edge 31 to top edge 32 of top 16. Second edge 33 of pocket 30 is attached along top edge 34 of side 18. Thus, the attachment provides a slit or access means 35 which is substantially the width of the top of front portion 18. Inside portion 36 of pocket 30 is porous. Such porosity can be accomplished by the inside portion being formed with a net, or plastic with holes punched therethrough for reasons to be explained.

Slot 35 can be left open or closed with a zipper or pressure sensitive adhering strips. In order to further extend the life of the dry ice placed in pockets 30, an external flap 37 is attached along seam 32 to top 16. Flap 37 extends over pocket 30 and is secured to the outside of second insulation 27 means by means of pressure adhering strips 38 which are attached to the outside second insulation 27 means, for example front portion 18. A mating pressure adhering strip 39 is attached along the outside of flap 37. If desired, flap 37 can be further secured by means of a buckle and strap apparatus 40. The pressure sensitive adhering strips will be placed on all four sides of second insulation means 27.

Figure 2:
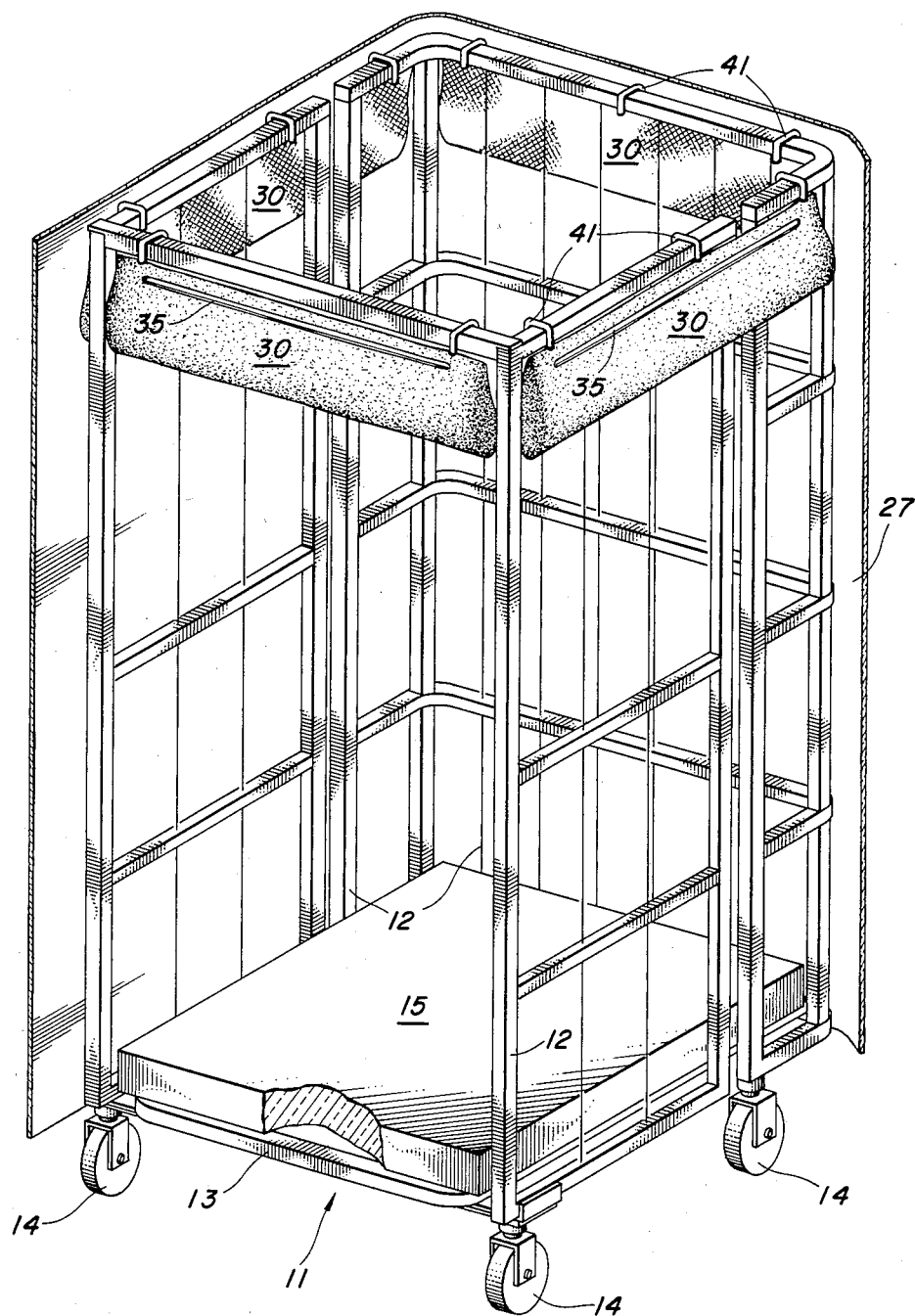
FIG. 2 is an alternate embodiment of the invention disclosed in FIG. 1.

A second embodiment is illustrated in FIG. 2. In this embodiment cart 11 has first insulating means 15 placed on the bottom as illustrated in FIG. 1. In addition, second insulating means 27 is formed around the outside and top portion of cart 11, likewise as illustrated in FIG. 1. In the embodiment of FIG. 2, however, no access is provided to pockets 30 through the top sides of second insulation means 27. In this embodiment, pockets 30 are mounted or attached to cart 11 in any suitable manner such as hooks 41. Slit 35 provides the access for the insertion of dry ice as described in FIG. 1. In this embodiment, the inside of pocket 30 will likewise be porous as previously described in FIG. 1. The embodiment illustrated in FIG. 2 then, would be similar to the embodiment illustrated in FIG. 1 with the exception that second insulation means 27 would be primarily a front and sides without pockets 30 or flaps 23 being attached to second insulation means 27. Second insulation means 27 would merely be slipped over cart 11 once the dry ice was inserted into slots 35. Front portion 18 would be tied in the usual manner illustrated in FIG. 1.

In the case of FIGS. 1 and 2, pockets 30 are illustrated as being made of a plastic or cloth material. It is obvious, that in the case of FIG. 2, a metal dry ice container could be attached around the top of cart 11 or be mounted permanently thereto and still be well within the spirit and scope of this invention.

OPERATION

Referring to FIGS. 1 AND 2, the operation of the apparatus will be described.

Normally cart 11 will have first insulation material 15 already in place. However, if it not, first insulation material 15 must be inserted on the bottom of cart 11 in order to provide adequate insulation for the lower placed perishable units. Once first insulation material 15 is in placed, then the units are stacked in a manner to fill cart 11 with the units to be protected. These units can be bags of ice, ice cream or other produce that must be kept in a frozen or refrigerated condition for an extended period of time. Once the material or produce has been stacked on cart 11 on top of first insulation material 15, with reference to the preferred embodiment illustrated in FIG. 1, second insulation material 27 is inserted around sides 12, back and over top 16 and pulled down tightly to cover all three sides of cart 11. Front portion 18 is then lowered over the front of the cart and secured by means of pressure adhering strips 25 and 26 along with belts 24 to tightly entrap the produce on the inside of cart 11 from shifting outside during transportation. Further, pressure adhering strips 25 and belts 24 insure a tight seal along the front of second insulation material 27. Once sides 12 and front 18 are secured, flaps 37 are lifted and slit 35 opened. Dry ice is then placed into pockets 30 on all four sides of the unit. During a normal storage, approximately five pounds of dry ice will be placed in each of pockets 30. Once the dry ice is secured slit 35 may be enclosed with a zipper or pressure adhering strips (if desired). Further, flap 37 can then be lowered over the dry ice pockets with or without a zipper over slit 35 in order to further insulate the dry ice pockets from the outside environment and to further prevent the escape of carbon-dioxide to the outside which is released by the dry ice as it sublimates. Once flap 37 is lowered, it is secured to front portion 18, for example, by pressing along pressure adhering strips 38 and 39 to properly and totally secure flap 37 to front portion 18. Buckles 40 may then be secured if desired. In many cases, buckles and straps 40 will not be needed. All the remaining three sides will be processed in a manner similar to that described for front portion 18.

As the dry ice sublimates, the released carbon-dioxide gas which is heavier than air, will pass down in the direction of arrows 50 along the space between second insulation material 27 and the produce stored inside cart 11. As the carbon dioxide passes downwards, it will sweep with it all of the hot air which has passed not only through second insulation material 27 but also any hot air which has passed upwardly (since hot air rises) as illustrated by arrow 51, from the bottom space between first insulation material 15 and second insulation material 27.

The apparatus of FIG. 2 operates exactly the same as the apparatus described in FIG. 1, the only exception being that the dry ice is inserted into pockets 30 through slits 35 prior to the placement of second insulation means 27 over cart 11. Once the dry ice has been placed through slits 35 and into pockets 30, then second insulation means 27 is slipped over cart 11 with the front which is opened as illustrated in FIG. 1 being secured in a manner similar to that illustrated in FIG. 1. The dry ice in pockets 30 will sublimate and, as it does, carbon-dioxide will be released which is heavier than air and fall downwardly along the space between second insulation means 27 and produce within cart 11. The falling carbon-dioxide will sweep any warm air which has passed through second insulation means 27 or up the space between second insulation means 27 and first insulation means 15. The carbon-dioxide will continue to fall outside the cart preventing the hot air from entering, or taking any hot air that has entered and removing it from the interior of the cart.

A cart, along the lines of that illustrated in FIG. 1, has been constructed and filled with one hundred bags of ice. Five pounds of dry ice was placed in each of the four pockets 30 and flaps 35 zipped closed. This configuration maintained a temperature of 20° F. or lower during a thirty-four hour period while transportation unit 10 stayed in a room temperature environment.

TRANSPORTATION METHOD

One of the unique features of transportation unit 10 is its ability to provide a new means for transporting perishable materials from a warehouse to a location such as a store. As previously discussed, the usual method for transporting perishable materials such as ice cream and ice has been to place the materials on a cart similar to cart 11 disclosed in this invention and then place cart 11 in a refrigerated truck for transport. Since the truck must be refrigerated, only produce that needs to be refrigerated is transported, thus, at least two trucks must be used to move all produce from the warehouse to the store, one refrigerated and one non-refrigerated. Normally only a portion of the material is removed from truck 10 at each store location. This invention, on the other hand, provides for a method for utilizing a non-refrigerated truck, that is, a truck that will maintain a temperature within the truck no more than 80° F., to transport the produce from a warehouse directly to the store where the material can be unloaded and inserted into the normal dispensing unit once it is received at the store.

In the customary manner the product, such as ice, is frozen and packaged at an ice plant for transportation to the various stores in the location of the ice plant. The prepackaged ice is then stacked on pallets and inserted into a refrigerator for curing and where it is stored until time for transportation to the various stores in the location. Once the ice is ready to be transported, the pallets are fork lifted into the refrigeration truck for transportation to the various stores. At the store location, the pallets are hand unloaded and moved into the store using two wheel dollies or store cart at which time the ice is then physically unloaded into the existing dispensing apparatuses within the store. The current method is obviously highly labor intensive. Labor must be used to transport the material from the warehouse to the pallets, to move the pallets from the warehouse then into the refrigerated trucks, out of the refrigerated trucks and into the various stores and then out of the pallets and into the dispensing apparatus. Furthermore, a high investment in refrigeration equipment is necessary since the trucks used to transport the material are extremely expensive. Furthermore, the ice must be sent in a separate truck from the produce normally being delivered to the store, that is, a truck from a warehouse will deliver all of the items ordered by the store for the day or for the period of time normally used for each reordering by the store managers. Once the order is received, the ice must be sent separately or else handled by a separate person, since there is no way for the stores to transport the produce normally used by the store and the ice in the same truck. As a consequence, most stores subcontract the ice to a separate vender so that the individual venders will then handle the dispensing of the ice in their refrigerated trucks.

Figure 3:
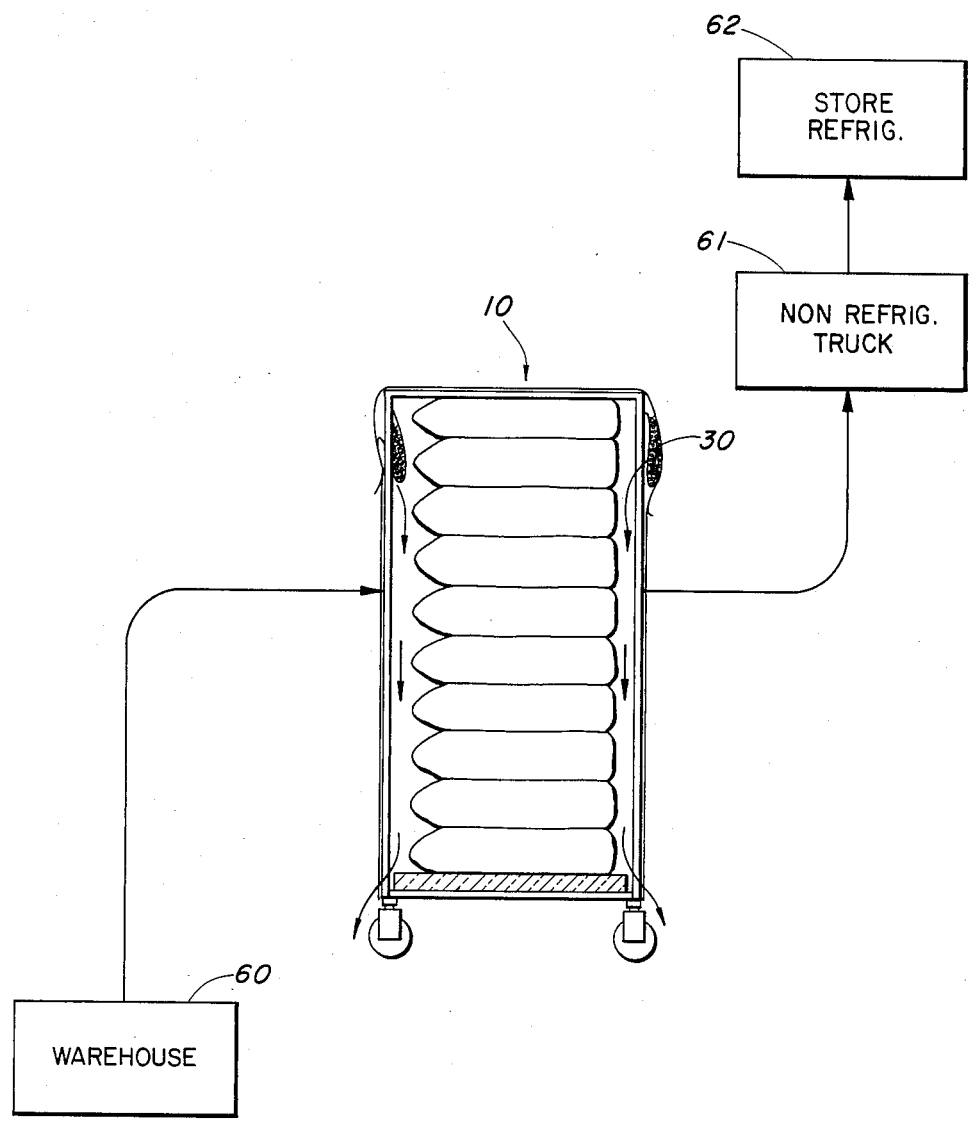
FIG. 3 illustrates the method of transportation utilizing this invention.

This invention, on the other hand, provides a means for transporting the ice along with all the other produce ordered by the store to the store location in one truck, thereby, substantially cutting costs to the warehouseman. As an example, the ice, once it is prepackaged, is placed on carts 11. Second insulation means 27 then surrounds cart 11 and the entire configuration is moved into the warehouse, or the ice can be placed on carts 11 and carts 11 moved into the refrigeration portion of the warehouse. When an order is received for the ice, the insulation material may then placed around cart 11, over top 16 of cart 11 and front portion of the insulation material tied to the side portion in order to make the package secure. Flaps 37 are then opened and five pounds or a selected amount of dry ice is inserted in each of the four pockets and flaps 37 are then repositioned and pressure sealed and/or buckled as necessary. The units are then rolled out of the refrigeration portion of the warehouse onto the dock for loading onto the produce trucks. Once the produce trucks arrive, all of the produce for the store, including the ice, is rolled onto the produce truck and delivered to the store. When the store receives the material it is simply unloaded along with the ice and second insulation means 27 is removed. Carts 11 are then rolled into the storage or vending apparatus in substitution for the carts already therein. The insulation material and empty folded cart or carts are then returned to the warehouse for reuse. Such a system is illustrated in FIG. 3 where warehouse 60 has transportation units 10 filled with ice and ready for transport. Once they are ready for transport, the dry ice is place within pockets 30 and pockets 30 sealed as previously described. Transport unit 10 is then moved to a non-refrigerated truck 61 where it is finally transported to a store 62 for eventual use.

CONCLUSIONS

It is obvious that changes and modifications can be made in the various methods for attaching the dry ice pockets either to second insulation means 27 or to cart 11. The basic invention provides a means for purging hot air from the interior of the storage unit 10 by utilizing the principal of the specific gravity of carbon-dioxide which, since it is heavier than air, will fall purging the hot air along the entire length of the insulation material and expel the hot air out the bottom of the storage unit. The insulation material is well known in the art and is not to be further described here. It is obvious that it can be an insulated padded material or it could be solid material connected in any usual manner to form a covering of insulation material around cart 11. It is obvious that further modifications and changes can be made in the concepts of the method or the apparatus and still be well within the scope of this invention as described in the specification and appended claims.

What I claim is:

1. Apparatus for the cooling of perishable materials stored on a cart means having at least a bottom comprising:
   (a) first insulation means extending over said bottom;
   (b) second flexible insulation means extending over said perishable material and to said bottom, said second insulation means having a top, sides, an inside and an outside surface said sides having a top and a bottom;
   (c) pocket means attached to said second insulation means and positioned on the inside of said second insulation means at the top of said sides said pocket means having permeable means through at least a portion of said pocket means;
   (d) access means through said sides of said second insulation means to said pocket means for permitting the insertion of refrigeration material there through and into said pocket means; and
   (e) means for closing said access means.

2. Apparatus as described in claim 1 wherein said means for closing comprises a flap means attached to said outside of said second insulation means and extending over said means for closing said access means.

3. Apparatus as described in claim 2 wherein said flap means includes means for securing said flap means to said sides.

4. Apparatus as described in claim 3 wherein said means for securing comprises a pressure adhering strip.

5. A method for transporting perishable materials from one location to a storage unit at a remote location over an extended period of time, said method comprising:
   (a) placing at said first location a predetermined supply of said perishable materials on a bottom insulated transportable cart;
   (b) covering said transportable cart with a second insulating material;
   (c) depositing in pockets at the highest point around said second insulating material, a quantity of solid refrigeration pellets;
   (d) removing said second insulation means along with said pockets at said remote location; and,
   (e) moving said transportable cart to said storage unit.

* * * * *